US008438982B2

(12) United States Patent
Stanford

(10) Patent No.: US 8,438,982 B2
(45) Date of Patent: *May 14, 2013

(54) TABLE WITH A TABLE TOP CONSTRUCTED FROM MOLDED PLASTIC

(75) Inventor: Carl R. Stanford, Clinton, UT (US)

(73) Assignee: Lifetime Products, Inc., Clearfield, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,760

(22) Filed: Dec. 12, 2011

(65) Prior Publication Data

US 2012/0111239 A1    May 10, 2012

Related U.S. Application Data

(63) Continuation of application No. 12/467,875, filed on May 18, 2009, now Pat. No. 8,074,582, which is a continuation of application No. 11/932,210, filed on Oct. 31, 2007, now Pat. No. 7,533,619, which is a continuation of application No. 11/566,621, filed on Dec. 4, 2006, now Pat. No. 7,461,602, which is a continuation of application No. 11/178,572, filed on Jul. 11, 2005, now Pat. No. 7,143,702, which is a continuation of application No. 10/964,096, filed on Oct. 13, 2004, now Pat. No. 6,915,748, which is a continuation of application No. 10/216,342, filed on Aug. 10, 2002, now Pat. No. 6,848,370, which is a continuation of application No. 09/635,303, filed on Aug. 9, 2000, now Pat. No. 6,431,092, which is a continuation-in-part of application No. 09/228,326, filed on Jan. 11, 1999, now Pat. No. 6,112,674, which is a continuation-in-part of application No. 29/095,372, filed on Oct. 21, 1998, now Pat. No. Des. 414,626.

(51) Int. Cl.
*A47B 3/00*    (2006.01)

(52) U.S. Cl.
USPC .......................................... 108/132; 108/129

(58) Field of Classification Search .................. 108/132, 108/129, 131, 115, 27, 161; 248/188.6
See application file for complete search history.

(56) References Cited

U.S. PATENT DOCUMENTS

| 236,197 A | 1/1881 | Valley |
| 236,741 A | 1/1881 | Weaver |

(Continued)

FOREIGN PATENT DOCUMENTS

| AU | 223700 | 5/1958 |
| BE | 650758 | 11/1964 |

(Continued)

OTHER PUBLICATIONS

U.S. Appl. No. 13/311,396, filed Dec. 5, 2011, Stanford.

(Continued)

*Primary Examiner* — Jose V Chen
(74) *Attorney, Agent, or Firm* — Maschoff Brennan

(57) ABSTRACT

A table includes a table top and a pair of support pedestals. A first pivotal support brace can be attached to the first support pedestal. A second pivotal support can be attached to the second support pedestal. The distal ends of the first and second pivotal support braces can be pivotally attached to a retaining assembly, which may include a cross-brace member. Alternatively, a second retaining assembly including a cross brace member may be mounted in relation to the table top. In addition, the first and second support pedestals may comprise at least one support leg, wherein each support leg of the first and second support pedestals are laterally offset from each other so as to permit an offset displacement of the support legs when the support pedestals are disposed in a collaspsed position.

24 Claims, 4 Drawing Sheets

U.S. PATENT DOCUMENTS

| | | |
|---|---|---|
| 769,354 A | 9/1904 | Nielsen |
| 1,063,642 A | 6/1913 | Birdsall |
| 1,266,929 A | 5/1918 | Enis |
| 1,272,187 A | 7/1918 | Basford |
| 1,296,336 A | 3/1919 | Stine |
| 1,351,013 A | 8/1920 | Stine |
| 1,514,418 A | 11/1924 | Battenfield |
| 1,594,572 A | 8/1926 | Soltesz |
| 1,659,840 A | 2/1928 | Smith |
| 1,709,928 A | 4/1929 | Whitney |
| 1,757,260 A | 5/1930 | Silverman |
| 1,765,766 A | 6/1930 | Lyon |
| 1,823,484 A | 9/1931 | Blumenthal |
| 1,836,934 A | 12/1931 | Morecroft |
| 1,836,943 A | 12/1931 | Temple |
| 1,888,117 A | 11/1932 | Fox |
| 1,956,946 A | 5/1934 | Duffy |
| 2,109,869 A | 3/1938 | Ross |
| 2,257,550 A | 9/1941 | Gay |
| 2,278,810 A | 4/1942 | Virtue |
| 2,326,461 A | 8/1943 | Howe |
| 2,411,658 A | 11/1946 | La Rue |
| 2,452,169 A | 10/1948 | Wells |
| 2,470,869 A | 5/1949 | Schmidt |
| 2,512,473 A | 6/1950 | Alch |
| 2,522,642 A | 9/1950 | Schmidt |
| 2,524,198 A | 10/1950 | La Rue |
| 2,548,682 A | 4/1951 | Price |
| 2,558,465 A | 6/1951 | Seymour |
| 2,568,622 A | 9/1951 | Hagan |
| 2,579,934 A | 12/1951 | Krasney |
| 2,583,247 A | 1/1952 | Aja et al. |
| 2,621,710 A | 12/1952 | Miller |
| 2,647,562 A | 8/1953 | Hoffar |
| 2,661,792 A | 12/1953 | Lysaght |
| 2,670,031 A | 2/1954 | Melges |
| 2,689,158 A | 9/1954 | Mahr |
| 2,690,210 A | 9/1954 | Holick |
| 2,717,028 A | 9/1955 | Villemune |
| 2,717,631 A | 9/1955 | Howe |
| 2,722,971 A | 11/1955 | Gallagher et al. |
| 2,748,837 A | 6/1956 | Beller |
| 2,752,987 A | 7/1956 | Smithers |
| 2,756,082 A | 7/1956 | Pucci |
| 2,766,812 A | 10/1956 | Schrader |
| 2,771,937 A | 11/1956 | Wilson |
| 2,780,506 A | 2/1957 | Howe |
| 2,788,059 A | 4/1957 | Mackintosh |
| 2,800,379 A | 7/1957 | Smithers |
| 2,805,708 A | 8/1957 | Bohn |
| 2,811,197 A | 10/1957 | Nimmo |
| 2,811,400 A | 10/1957 | James |
| 2,823,087 A | 2/1958 | Zimmer |
| 2,825,390 A | 3/1958 | Post |
| 2,831,688 A | 4/1958 | Knox |
| 2,837,141 A | 6/1958 | Shore |
| 2,849,053 A | 8/1958 | Beller et al. |
| 2,878,589 A | 3/1959 | Howe et al. |
| 2,936,820 A | 5/1960 | Blink et al. |
| 2,939,516 A | 6/1960 | Drew |
| 2,959,209 A | 11/1960 | Lakin |
| 2,964,368 A | 12/1960 | Heyer |
| 2,978,754 A | 4/1961 | Wilson |
| 2,983,308 A | 5/1961 | Horowitz |
| 2,992,043 A | 7/1961 | Nelson |
| 2,999,729 A | 9/1961 | Semmelroth |
| 3,025,120 A | 3/1962 | Howe |
| 3,027,209 A | 3/1962 | Nielsen |
| 3,030,728 A | 4/1962 | Wesman |
| 3,041,775 A | 7/1962 | Brown, Jr. et al. |
| 3,079,197 A | 2/1963 | Mugler |
| 3,080,193 A | 3/1963 | Nimmo |
| 3,093,924 A | 6/1963 | Pompa |
| 3,096,866 A | 7/1963 | Glass |
| 3,101,062 A | 8/1963 | Kanzelberger |
| 3,112,954 A | 12/1963 | Kanitz |
| 3,141,424 A | 7/1964 | Seymour |
| 3,143,982 A | 8/1964 | Blink et al. |
| 3,144,236 A | 8/1964 | Clanin |
| 3,166,029 A | 1/1965 | Acton |
| 3,174,796 A | 3/1965 | Brown |
| 3,191,991 A | 6/1965 | Anderson et al. |
| 3,256,037 A | 6/1966 | Giambalvo |
| 3,259,426 A | 7/1966 | Shaw et al. |
| 3,267,886 A | 8/1966 | Glass |
| 3,273,936 A | 9/1966 | Deavers |
| 3,276,815 A | 10/1966 | Cardy |
| 3,337,262 A | 8/1967 | Katzfey et al. |
| 3,349,728 A | 10/1967 | Barecki et al. |
| 3,353,867 A | 11/1967 | Anderson |
| 3,357,729 A | 12/1967 | Krueger |
| 3,410,232 A | 11/1968 | Krueger |
| 3,429,283 A | 2/1969 | Uhor |
| 3,439,634 A | 4/1969 | Bender |
| 3,545,738 A | 12/1970 | Stagg |
| 3,574,393 A | 4/1971 | Hughes |
| 3,580,632 A | 5/1971 | Seymour |
| 3,650,560 A | 3/1972 | Wohlk |
| 3,672,719 A | 6/1972 | Haukedahl |
| 3,692,358 A | 9/1972 | Sung |
| 3,731,971 A | 5/1973 | Sjogren |
| 3,762,626 A | 10/1973 | Dorsey |
| 3,765,719 A | 10/1973 | Silver |
| 3,769,920 A | 11/1973 | Weiss |
| 3,788,696 A | 1/1974 | Loewen |
| 3,797,884 A | 3/1974 | Gutierrez |
| 3,857,343 A | 12/1974 | Greenberg |
| 3,885,829 A | 5/1975 | Haeger |
| 3,893,400 A | 7/1975 | Grant |
| 3,905,478 A | 9/1975 | Peterson et al. |
| 3,922,408 A | 11/1975 | Smith |
| 3,960,354 A | 6/1976 | Simikoski |
| 3,994,527 A | 11/1976 | Nikitits et al. |
| 4,040,658 A | 8/1977 | Mayol |
| 4,043,277 A | 8/1977 | Wallace |
| 4,047,754 A | 9/1977 | Cathey |
| 4,052,100 A | 10/1977 | Nikitits et al. |
| 4,060,275 A | 11/1977 | Hansen |
| 4,064,812 A | 12/1977 | Commanda |
| 4,064,815 A | 12/1977 | Baum |
| 4,070,057 A | 1/1978 | Jones |
| 4,072,231 A | 2/1978 | Helms |
| 4,111,482 A | 9/1978 | Jones |
| 4,131,311 A | 12/1978 | Nikitits et al. |
| 4,157,089 A | 6/1979 | Loughrey |
| 4,191,111 A | 3/1980 | Emmert |
| RE30,274 E | 5/1980 | Bolon et al. |
| 4,249,773 A | 2/1981 | Giambalvo |
| 4,289,350 A | 9/1981 | Thomas et al. |
| 4,330,151 A | 5/1982 | Healey |
| 4,382,627 A | 5/1983 | Dean |
| 4,415,199 A | 11/1983 | Wright |
| 4,438,603 A | 3/1984 | Durkan, Jr. |
| 4,462,636 A | 7/1984 | Markson |
| 4,471,969 A | 9/1984 | Zabala et al. |
| 4,487,328 A | 12/1984 | Wilcox |
| 4,489,661 A | 12/1984 | Fitzgerald |
| 4,537,443 A | 8/1985 | Bray |
| 4,538,526 A | 9/1985 | Seeley |
| 4,557,200 A | 12/1985 | Geschwender |
| 4,563,374 A | 1/1986 | Treber |
| 4,572,574 A | 2/1986 | Fischhaber et al. |
| 4,596,196 A | 6/1986 | Gunter et al. |
| 4,606,575 A | 8/1986 | Kodet |
| 4,648,652 A | 3/1987 | Van Kuren |
| 4,653,804 A | 3/1987 | Yoo et al. |
| 4,700,987 A | 10/1987 | Sraka et al. |
| 4,740,032 A | 4/1988 | Olsen et al. |
| 4,744,309 A | 5/1988 | Kiesel et al. |
| 4,759,296 A | 7/1988 | Simpson |
| 4,762,321 A | 8/1988 | Chang |
| 4,762,379 A | 8/1988 | Beam |
| 4,815,394 A | 3/1989 | Ettlinger et al. |
| 4,817,902 A | 4/1989 | Mason |
| 4,822,066 A | 4/1989 | Rehrig |
| 4,826,244 A | 5/1989 | Choi |
| 4,834,450 A | 5/1989 | Stickler |

| | | | | | | |
|---|---|---|---|---|---|---|
| 4,841,877 | A | 6/1989 | Virtue | 6,371,034 | B1 | 4/2002 | Simpson et al. |
| 4,841,879 | A | 6/1989 | Ferguson | 6,431,092 | B1 | 8/2002 | Stanford |
| 4,846,076 | A | 7/1989 | Menges, Sr. | 6,443,521 | B1 | 9/2002 | Nye et al. |
| 4,864,941 | A | 9/1989 | Goulter | 6,471,173 | B1 | 10/2002 | Tseng |
| 4,883,314 | A | 11/1989 | Sakong | 6,520,094 | B2 | 2/2003 | Wen |
| 4,903,686 | A | 2/1990 | Jennings | 6,530,331 | B2 | 3/2003 | Stanford |
| 4,951,576 | A | 8/1990 | Cobos et al. | 6,550,404 | B2 | 4/2003 | Stanford |
| 4,960,303 | A | 10/1990 | York | 6,615,743 | B2 | 9/2003 | Nien |
| 4,998,395 | A | 3/1991 | Bezner | 6,622,644 | B2 | 9/2003 | Buono |
| 5,007,673 | A | 4/1991 | Cheng | 6,651,568 | B1 | 11/2003 | Buono |
| 5,009,170 | A | 4/1991 | Spehar | 6,655,301 | B2 | 12/2003 | Stanford |
| 5,014,628 | A | 5/1991 | Roberts | 6,694,897 | B2 | 2/2004 | Lou-Hao |
| 5,018,785 | A | 5/1991 | Monson et al. | 6,732,663 | B2 | 5/2004 | Tsai |
| 5,029,938 | A | 7/1991 | Song | 6,752,091 | B2 | 6/2004 | Glover |
| 5,060,902 | A | 10/1991 | Hartman | 6,772,700 | B2 | 8/2004 | Wong |
| 5,070,664 | A | 12/1991 | Groh et al. | 6,823,806 | B2 | 11/2004 | Buono |
| 5,104,607 | A | 4/1992 | Driska | 6,832,563 | B2 | 12/2004 | Stanford |
| 5,109,778 | A | 5/1992 | Berkowitz et al. | 6,848,370 | B1 | 2/2005 | Stanford |
| 5,149,575 | A | 9/1992 | Soifer | 6,877,441 | B2 | 4/2005 | Zheng |
| 5,208,084 | A | 5/1993 | Rutz | 6,895,872 | B2 | 5/2005 | Stanford |
| 5,240,307 | A | 8/1993 | Jones et al. | 6,915,748 | B2 | 7/2005 | Stanford |
| 5,271,338 | A | 12/1993 | Bonham | 6,920,832 | B2 | 7/2005 | Lou-Hao |
| 5,279,233 | A | 1/1994 | Cox | 6,931,999 | B2 | 8/2005 | Stanford |
| 5,284,100 | A | 2/1994 | Thorn | 6,945,178 | B1 | 9/2005 | Nye |
| 5,314,231 | A | 5/1994 | Otterbacher | 6,968,789 | B2 | 11/2005 | Baik et al. |
| 5,321,873 | A | 6/1994 | Goria | 7,044,068 | B2 | 5/2006 | Stanford |
| 5,323,713 | A | 6/1994 | Luyk et al. | 7,051,662 | B2 | 5/2006 | Shenghao et al. |
| 5,325,793 | A | 7/1994 | Martin | 7,055,899 | B2 | 6/2006 | Zhurong |
| 5,335,594 | A | 8/1994 | Karlyn et al. | 7,073,450 | B2 | 7/2006 | Tsai |
| D350,862 | S | 9/1994 | Beller | 7,096,800 | B2 | 8/2006 | Stanford |
| 5,357,872 | A | 10/1994 | Wilmore | 7,100,518 | B2 | 9/2006 | Strong |
| 5,377,601 | A | 1/1995 | Cashen | 7,100,519 | B2 | 9/2006 | Tsai |
| 5,383,411 | A | 1/1995 | Tomaka | 7,111,563 | B2 | 9/2006 | Strong |
| 5,394,808 | A | 3/1995 | Dutro et al. | 7,114,453 | B2 | 10/2006 | Stanford |
| 5,409,245 | A | 4/1995 | Kern et al. | 7,128,002 | B2 | 10/2006 | Stanford |
| 5,411,314 | A | 5/1995 | Wallace | 7,143,677 | B2 | 12/2006 | Zeder |
| 5,421,272 | A | 6/1995 | Wilmore | 7,143,702 | B2 | 12/2006 | Stanford |
| 5,440,857 | A | 8/1995 | Shanok et al. | 7,150,237 | B2 | 12/2006 | Lin |
| 5,443,020 | A | 8/1995 | Price | 7,178,471 | B2 | 2/2007 | Strong |
| 5,478,040 | A | 12/1995 | Rellinger | 7,299,754 | B2 | 11/2007 | Stanford |
| 5,483,901 | A | 1/1996 | Tisbo et al. | 7,299,755 | B2 | 11/2007 | Stanford |
| 5,488,926 | A | 2/1996 | Hunt | 7,331,297 | B2 | 2/2008 | Strong |
| 5,505,142 | A | 4/1996 | Fink | 7,373,889 | B2 | 5/2008 | Nye |
| 5,507,484 | A | 4/1996 | vanNimwegen | 7,428,872 | B2 | 9/2008 | Strong |
| 5,536,552 | A | 7/1996 | Scripsick | 7,434,522 | B2 | 10/2008 | Stanford |
| 5,622,120 | A | 4/1997 | Yeh | 7,461,602 | B2 | 12/2008 | Stanford |
| 5,623,882 | A | 4/1997 | Price | 7,461,603 | B2 | 12/2008 | Stanford |
| 5,626,339 | A | 5/1997 | Schickert et al. | 7,464,654 | B2 | 12/2008 | Stanford |
| 5,636,578 | A | 6/1997 | Rizzi | 7,475,642 | B2 | 1/2009 | Shenghao |
| 5,638,761 | A | 6/1997 | Berkowitz et al. | 7,475,643 | B2 | 1/2009 | Haney |
| 5,662,303 | A | 9/1997 | Rellinger | 7,533,619 | B2 | 5/2009 | Stanford |
| 5,678,491 | A | 10/1997 | Price et al. | 7,536,961 | B2 | 5/2009 | Stanford |
| 5,694,865 | A | 12/1997 | Raab | 7,571,686 | B2 | 8/2009 | Stanford |
| 5,730,066 | A | 3/1998 | Auten et al. | 7,621,224 | B2 | 11/2009 | Lin et al. |
| 5,732,637 | A | 3/1998 | Raab | 7,806,060 | B2 | 10/2010 | Stanford |
| 5,860,367 | A | 1/1999 | Riegel et al. | 8,042,476 | B2 | 10/2011 | Stanford |
| D405,631 | S | 2/1999 | Burdick | 8,069,796 | B2 | 12/2011 | Stanford |
| 5,865,128 | A | 2/1999 | Tarnay | 8,074,582 | B2 * | 12/2011 | Stanford ........................ 108/132 |
| 5,868,081 | A | 2/1999 | Raab | 2003/0127028 | A1 | 7/2003 | Baik et al. |
| 5,909,021 | A | 6/1999 | Duffy | 2003/0164123 | A1 | 9/2003 | Lou-Hao |
| 5,921,623 | A | 7/1999 | Nye et al. | 2003/0177962 | A1 | 9/2003 | Stanford |
| 5,947,037 | A | 9/1999 | Hornberger et al. | 2003/0233967 | A1 | 12/2003 | Lin |
| D414,626 | S | 10/1999 | Collins et al. | 2004/0031422 | A1 | 2/2004 | Wong |
| 5,983,807 | A | 11/1999 | Tarnay et al. | 2004/0099189 | A1 | 5/2004 | Stanford |
| 5,984,047 | A | 11/1999 | Rogers | 2004/0187747 | A1 | 9/2004 | Shenghao et al. |
| 5,992,331 | A | 11/1999 | Inoue et al. | 2004/0187748 | A1 | 9/2004 | Shenghao et al. |
| 6,000,345 | A | 12/1999 | Gillotti | 2004/0194675 | A1 | 10/2004 | Shenghao et al. |
| D419,332 | S | 1/2000 | Collins et al. | 2004/0194677 | A1 | 10/2004 | Degen |
| D420,527 | S | 2/2000 | Pinch et al. | 2004/0237856 | A1 | 12/2004 | Shenghao et al. |
| 6,032,585 | A | 3/2000 | Pinch | 2004/0244656 | A1 | 12/2004 | Shenghao et al. |
| D423,258 | S | 4/2000 | Pinch | 2004/0255829 | A1 | 12/2004 | Cizmar |
| 6,058,853 | A | 5/2000 | Pinch | 2005/0045075 | A1 | 3/2005 | Stanford |
| 6,076,472 | A | 6/2000 | Lloyd | 2005/0045076 | A1 | 3/2005 | Stanford |
| 6,086,148 | A | 7/2000 | Gatto et al. | 2005/0061213 | A1 | 3/2005 | Tsai |
| 6,109,687 | A | 8/2000 | Nye et al. | 2005/0061214 | A1 | 3/2005 | Tsai |
| 6,112,674 | A | 9/2000 | Stanford | 2005/0155534 | A1 | 7/2005 | Lin |
| D442,788 | S | 5/2001 | Nye et al. | 2005/0160950 | A1 | 7/2005 | Haney |
| 6,334,400 | B1 | 1/2002 | Nien | 2006/0021552 | A1 | 2/2006 | Pleiman |
| 6,347,831 | B1 | 2/2002 | Nye et al. | 2008/0105171 | A1 | 5/2008 | Stanford |

| | | | |
|---|---|---|---|
| 2008/0110378 | A1 | 5/2008 | Stanford |
| 2009/0223424 | A1 | 9/2009 | Stanford |
| 2009/0229499 | A1 | 9/2009 | Stanford |
| 2009/0293780 | A1 | 12/2009 | Stanford |
| 2010/0000448 | A1 | 1/2010 | Lin et al. |
| 2011/0017109 | A1 | 1/2011 | Stanford |

FOREIGN PATENT DOCUMENTS

| | | |
|---|---|---|
| CA | 2166651 | 7/1996 |
| DE | 341007 | 5/1920 |
| DE | 3705566 | 9/1988 |
| EP | 0572331 | 12/1933 |
| FR | 2553644 | 4/1985 |
| FR | 2637474 | 4/1990 |
| GB | 10007 | 0/1908 |
| GB | 1457271 | 12/1976 |
| GB | 1595210 | 8/1981 |
| JP | 07171877 | 9/1995 |
| JP | 08108464 | 4/1996 |
| JP | 09065934 | 3/1997 |
| JP | 09065934 | 5/1997 |
| JP | H10-75825 | 3/1998 |
| JP | 10192060 | 7/1998 |
| TW | 320006 | 3/1997 |
| WO | WO 94/12075 | 6/1994 |
| WO | WO 95/10204 | 4/1995 |

OTHER PUBLICATIONS

U.S. Appl. No. 13/280,283, filed Oct. 24, 2011, Stanford.
U.S. Appl. No. 12/897,569, filed Oct. 4, 2010, Stanford.
U.S. Appl. No. 12/538,839, filed Aug. 10, 2009, Stanford.
U.S. Appl. No. 12/467,895, filed May 18, 2009, Stanford.
U.S. Appl. No. 12/467,875, filed May 18, 2009, Stanford.
U.S. Appl. No. 12/471,445, filed May 25, 2009, Stanford.
Office Action dated Jul. 22, 2008 cited in related U.S. Appl. No. 11/932,210.
Office Action dated Jul. 25, 2008 cited in related U.S. Appl. No. 11/932,290.
Office Action dated Jul. 29, 2008 cited in related U.S. Appl. No. 11/932,331.
Office Action dated Jul. 31, 2008 cited in related U.S. Appl. No. 11/932,167.
Notice of Allowance dated Jan. 30, 2009 cited in U.S. Appl. No. 11/932,210.
Notice of Allowance dated Feb. 11, 2009 cited in U.S. Appl. No. 11/932,290.
Notice of Allowance dated Apr. 3, 2009 cited in U.S. Appl. No. 11/932,331.
Atlas Table ad sheet, Published by All-Luminum, Inc. 1988-1990.
E-Mail Correspondence: Utility Table and the LDS Church, 1 page, Apr. 23, 1998.
E-Mail Correspondence: Costco—Utility Table Trip Report, 1 page, Jun. 17, 1998.
Pre-Jan. 11, 1998 2900 Calls on Costco, 1 page, date unknown.
Second Supplemental Responses and Objections to Plaintiff's First Set of Interrogatories to Defendant GSC Technology Inc., 134 pages, Mar. 12, 2004. *Lifetime Products, Inc.* v. *GSC Technology Corp.* Case No. 03 cv 3943(N.D. Illinois).
Supplemental Responses of Defendant Maxchief Investments, Ltd. to Plaintiff's First Set of Interrogatories, 10 pages (including Exhibits), Sep. 17, 2003. *Lifetime Products, Inc.* v. *Alton Industries, Inc.* and *Maxchief Investments, Ltd*. Case No. 02-350 GLT (ANx).
Supplemental Respones of Defendant Alton Industries, Inc. to Plaintiff's Interrogatories, 21 pages (including Exhibits), Sep. 10, 2003. *Lifetime Products, Inc.* v. *Alton Industries, Inc.* and *Maxchief Investments, Ltd*. Case No. 02-350 GLT (ANx).
Defendant Office Star Products' Responses to Plaintiffs Second Set of Interrogatories, 37 pages, Dec. 23, 2003. *Lifetime Products, Inc*, v. *Office Star Products*, Case No. SA CV 03-33 GTL (ANx).
Supplemental Responses of Defendant Maxchief Investments, Ltd. to Plaintiff's First Set of Interrogatories, 7 pages, Apr. 22, 2003. *Lifetime Products, Inc*, v. *Alton Industries, Inc.* and *Maxchief Investments, Ltd*. Case No. 02-350 GLT (ANx).
Lifetime Leisure, DuraTable Two in One, 1 page, undated.
Lifetime, Table Prototype A, 1 page, undated.
Lifetime, Table Prototype B, 3 pages, undated.
Lifetime, Table Prototype C, 3 pages, updated.
Globe Business Furniture, De-Lite Compact Folding Table, letter and brochure, Jun. 1, 1993.
Virco, c1970, p. 41, folding table #6200.
Virco, c1970, p. 47, Folding Table #6000.
Fixtures Furniture, Jan. 1991, List price workbook, p. 112 #01001 table top at lower right.
Huffy Sports, "Performance Series," Product Information Brochure, 5 pages.
Lifetime Picnic Table, Jul. 1997 (4 pages).
Lifetime Six Foot Utility Table, date unknown (12 pages).
Lifetime Leisure One-Minute Set-Up Picnic Tables, Apr. 1997 (5 pages).
Lifetime Model 2150, Apr. 1997 (7 pages).
All-Luminum Products, Inc., Gimbels, Folding Drop-leaf Table 36".times.72", 1 page.
All-Luminum Products, Inc., Lightweight Centerfold Banquet Table, 1 page.
All-Luminum Products, Inc., Fine Folding Furniture, 1 page.
All-Luminum Products, Inc., 36 Position Leisure Lounge, 1 page.
All-Luminum Products, Inc., Formwood, Sew Tables/Atlas Legs/Adjust-a-Table, 1 page.
All-Luminum Products, Inc., Beauty-Fold Tables, 1 page.
All-Luminum Products, Inc., Spring Sun-Cot, 1 page.
All-Luminum Products, Inc., Alumilite Tables, 2 pages, 1975.
All-Luminum Products, Inc., All-Luminum . . . The Action Line Manufacturers of Fine Folding Furniture, 6 pages.
All-Luminum Products, Inc., Advertising Art & Copy, 6 pages.
All-Luminum Products, Inc., Tables, 1 page.
All-Luminum Products, Inc., Casual Furniture Classics, 2 pages.
All-Luminum Products, Inc., Marshall Field & Company, Adjustable, 1 page.
All-Luminum Products, Inc., Rest Assured on All-Luminum Folding Beds, 1 page.
All-Luminum Products, Inc., Tables/Cot, 1 page.
All-Luminum Products, Inc., Round Table, 1 page.
All-Luminum Products, Inc., Beauty-Fold Casual Furniture, 8 pages.
Windsor Metal Products, 5 pages.
All-Luminum Products, Inc., Design-A-Wall, 1 page.
All-Luminum Products, Inc., Model No. PT 2760, 1 page.
All-Luminum Products, Inc., Adjust-A-Bed, 1 page.
All-Luminum Products, Inc., Atlas Folding Table, 2 pages.
All-Luminum Products, Inc., Fanta Furniture/Pro-Action Tennis Table, 2 page.
All-Luminum Products, Inc., Ambassador Planned Profit Program, 8 pages.
All-Luminum Products, Inc., Rollaway Beds, 1 page.
All-Luminum Products, Inc., Atlas Chromite-Finish Folding Legs, 1 page.
All-Luminum Products, Inc., Fanta Furniture, 1 page.
All-Luminum Products, Inc., All-Luminum Products Casual Furniture, 11 pages, Oct. 1, 1988.
All-Luminum Products, Inc., Cutting Table, 6 pages, Sep. 6, 2000.
All-Luminum Products, Inc., 27.times.8 Main Table and Parts, 8 pages, Jul. 6, 2005.
Notice of Allowability from related U.S. Appl. No. 11/932,167 dated Feb. 1, 2010.
Office Action dated Jul. 21, 2005 cited in U.S. Appl. No. 11/130,743.
Notice of Allowance dated Oct. 27, 2005 cited in U.S. Appl. No. 11/130,743.
Office Action dated Oct. 31, 2005 cited in U.S. Appl. No. 11/178,677.
Office Action dated Nov. 25, 2005 cited in U.S. Appl. No. 11/178,572.
Notice of Allowance dated May 23, 2006 cited in U.S. Appl. No. 11/178,572.
Notice of Allowance dated Jun. 5, 2006 cited in U.S. Appl. No. 11/178,677.
Office Action dated Jan. 19, 2007 cited in U.S. Appl. No. 11/537,820.
Office Action dated Feb. 20, 2007 cited in U.S. Appl. No. 11/554,371.
Office Action dated Mar. 15, 2007 cited in U.S. Appl. No. 11/566,621.

Notice of Allowance dated Jun. 14, 2007 cited in U.S. Appl. No. 11/433,994.
Notice of Allowance dated Aug. 10, 2007 cited in U.S. Appl. No. 11/554,371.
Office Action dated Aug. 31, 2007 cited in U.S. Appl. No. 11/566,621.
Notice of Allowance dated Sep. 6, 2007 cited in U.S. Appl. No. 11/433,994.
Office Action dated Oct. 13, 2006 cited in U.S. Appl. No. 11/433,994.
Office Action dated Nov. 9, 2007 cited in U.S. Appl. No. 11/537,820.
Notice of Allowance dated Nov. 16, 2007 cited in U.S. Appl. No. 11/554,371.
Office Action dated Feb. 8, 2008 cited in U.S. Appl. No. 11/845,433.
Notice of Allowance dated Jun. 13, 2008 cited in U.S. Appl. No. 11/537,820.
Notice of Allowance dated Aug. 7, 2008 cited in U.S. Appl. No. 11/845,433.
Notice of Allowance dated Aug. 8, 2008 cited in U.S. Appl. No. 11/554,371.
Notice of Allowance dated Sep. 12, 2008 cited in U.S. Appl. No. 11/566,621.
Office Action dated May 12, 2009 cited in U.S. Appl. No. 11/932,167.
Examiner's Amendment dated May 19, 2009 cited in U.S. Appl. No. 11/932,331.
Notice of Allowance dated Feb. 1, 2010 cited in U.S. Appl. No. 11/932,167.
Notice of Allowance dated May 27, 2010 cited in U.S. Appl. No. 11/932,167.
Office Action dated Nov. 24, 2010 cited in U.S. Appl. No. 12/538,839.
Office Action dated Jan. 18, 2011 cited in U.S. Appl. No. 12/467,875.
Office Action dated Apr. 11, 2011 cited in U.S. Appl. No. 12/471,445.
Office Action dated Apr. 6, 2012 from U.S. Appl. No. 13/280,283.
Office Action dated May 15, 2012 from U.S. Appl. No. 13/311,396.
Notice of Allowance dated May 31, 2012 from U.S. Appl. No. 12/897,569.

* cited by examiner

TABLE WITH A TABLE TOP CONSTRUCTED FROM MOLDED PLASTIC

CROSS-REFERENCE TO RELATED APPLICATIONS

The present application is a continuation of U.S. patent application Ser. No. 12/467,875, which was filed on May 18, 2009, now U.S. Pat. No. 8,074,582; which is a continuation of U.S. patent application Ser. No. 11/932,210, filed on Oct. 31, 2007, now U.S. Pat. No. 7,533,619; which is a continuation of U.S. patent application Ser. No. 11/566,621, filed on Dec. 4, 2006, now U.S. Pat. No. 7,461,602; which is a continuation of U.S. patent application Ser. No. 11/178,572, filed on Jul. 11, 2005, now U.S. Pat. No. 7,143,702; which is a continuation of U.S. patent application Ser. No. 10/964,096, filed on Oct. 13, 2004, now U.S. Pat. No. 6,915,748; which is a continuation of U.S. patent application Ser. No. 10/216,342, filed on Aug. 10, 2002, now U.S. Pat. No. 6,848,370; which is a continuation of U.S. patent application Ser. No. 09/635,303, filed on Aug. 9, 2000, now U.S. Pat. No. 6,431,092; which is a continuation-in-part of U.S. patent application Ser. No. 09/228,326, filed on Jan. 11, 1999, now U.S. Pat. No. 6,112,674; which is a continuation-in-part of U.S. patent application serial no. 29/095,372, filed on Oct. 21, 1998, now U.S. Pat. No. Des. 414,626; all of which are incorporated by reference in their entireties.

BACKGROUND OF THE INVENTION

1. The Field of the Invention

The present invention is related to a utility table, and more particularly, to a portable folding utility table having a single center support assembly.

2. Technical Background

Portable folding utility tables are indispensable for groups or organizations that have limited floor space usable for multiple purposes. For example, foldable utility tables can be placed in a pre-determined configuration to meet the space requirements of a school gymnasium, a church multi-purpose room, or a hotel conference meeting room. Afterward, the tables can be neatly stored away and the room used for a different purpose. Thus, portable folding utility tables allow a group or organization to maximize the efficiency and utility of a particular space.

Foldable utility tables can also provide an immediate temporary work space in a garage, tool shed, and the like. The portability and foldability of these utility tables allows a user to conveniently set up, take down, and store the table whenever and wherever the user chooses.

A major drawback with many portable folding utility tables of the prior art is their inherent size and bulkiness. Many such utility tables require two people to collapse and store the table after use. Moreover, some prior art portable folding utility tables are heavy enough to cause injury if dropped or mishandled. These unwieldy tables are usually made from hardwood, particle board, or similarly heavy materials. In an attempt to overcome this bulkiness problem, some prior art portable utility tables are formed of lighter-weight materials. However, many of these utility tables generally lack the sturdiness of the heavier-weight prior art utility tables.

Another disadvantage in many prior art utility tables is the means used for attaching the table legs or two or more support pedestals to the underside of the table. As will be appreciated, prior art table legs are typically attached to the table top using threaded screws or bolts that are drilled into the underside of the table top. This means of attachment may compromise the integrity of the table top thereby making it weaker at the point of attachment between the table legs and the table top. Other attachment mechanisms may include a form of bonding the support legs as support pedestals directly against the surface of the table top. Often, however, this means of attachment by bonding weakens the structural integrity of the table top. Thus, when the support legs fail, the table top material may pull away at the point of the bonded attachment making the table costly, if not impossible to repair.

In an attempt to overcome the foregoing disadvantages, prior art utility tables were developed by those skilled in the art that are equipped with complex or heavy-duty attachment mechanisms to secure the support legs or support pedestals to the table top. These types of attachment mechanisms, however, are normally heavier, more costly, more difficult to install, and typically require additional time to manufacture.

The previously stated disadvantages are compounded by the fact that prior art utility tables incorporate a separate and distinct attachment mechanism for attaching each support leg or pedestal to the table top. Most existing portable folding utility tables have two sets of legs or support pedestal supports, one at each end of the table. Each of these supports is typically attached to the underside of the table top at two places. Correspondingly, many of these tables have four separate points of attachment, each with a separate attachment mechanism. One particular problem with utility tables having separate and distinct attachment mechanisms is that they are generally susceptible to bowing in the center of the table under stress. This is especially true with larger banquet-style tables.

Yet another drawback with many prior art utility tables is that the hard materials used to maintain a sufficient rigidity and sturdiness of the table top often have sharp edges which may be uncomfortable for the user to lean against or rest their arms upon. Further, these materials are also susceptible to damage from the elements of nature.

From the foregoing, it will be appreciated that it would be an advancement in the art to provide a portable folding utility table that is durable enough to withstand the increased wear and tear that portable utility tables are subjected to over long periods of time and sturdy enough to support varying sized loads that will be place on the table, while at the same time being light-weight enough to be easily set up and taken down.

It would be another advancement in the art to provide a portable folding utility table having a leg or support pedestal attachment mechanism that doesn't involve a complex design, heavy-duty attachment hardware, or need to be screwed, bolted, or bonded to the underside of the table top. It would be a further advancement in the art to provide a portable folding utility table that minimizes the points of attachment to the table top and facilitates attachment mechanisms that interrelate with each other to support the table top above a surface.

Finally, it would be an advancement in the art to provide a portable folding utility table that provides a working surface that is comfortable to work at and that is capable of withstanding the elements of nature.

Such a portable folding utility table is disclosed and claimed herein.

BRIEF SUMMARY OF THE INVENTION

The present invention is directed to a novel portable folding utility table having a center support assembly. The utility table includes a table top supported by a pair of support pedestals. In one presently preferred embodiment, the table top includes a mounting surface and a working surface formed opposite the mounting surface. The working surface may be textured and may include an outer periphery, at least a portion of which is beveled to provide comfort to a user.

A first end of each support pedestal is preferably attached to the mounting surface of the table top. In one presently preferred embodiment, the support pedestals are pivotally attached to the mounting surface of the table top, to allow each support pedestal to be moved between a collapsed position and an extended position. A securing member may also be attached to the mounting surface for releasably securing a support pedestal in the collapsed position.

Additionally, the utility table may include a first pivoting support brace attached to the first support pedestal at a proximal end and to the mounting surface at a distal end thereof. Similarly, a second pivoting support brace may be attached to the second support pedestal at a proximal end and to the mounting surface at a distal end thereof. In one presently preferred embodiment, the distal ends of the first and second pivotal support braces are disposed contiguous to each other at a retention assembly attached to the mounting surface.

In one presently preferred embodiment of the present invention, the retention assembly may include a single crossbrace member disposed through openings formed at the distal ends of the pivotal support braces and secured to the mounting surface. The mounting surface may be configured such that the cross-brace member is disposed through openings disposed in opposing sides of the mounting surface of the table top and may further include a mount for receiving and retaining the cross-brace member therein. Thus, both support pedestals are preferably attached to the cross-brace member secured to the mounting surface, thereby reducing the number of attachment mechanisms and interrelating the support pedestals to increase structural support and efficiency of manufacture.

In another presently preferred embodiment, each support pedestal includes a first member pivotally engaging the mounting surface of the table top and a second member configured for telescoping engagement with the first member. This configuration permits the height of the support pedestal to be disposed between a lengthened position and a retracted position.

From the foregoing, it will be appreciated that the present invention provides a portable folding utility table that is durable enough to withstand increased wear and tear yet is light-weight for easy set up and take down. The present invention also provides a novel center support assembly that provides increased structural stability with efficient design such that to allow the interrelation of the support pedestals. The center support assembly is also cost effective to manufacture and doesn't compromise the integrity of the table top. Further, the present invention provides a utility table that is comfortable to work at. The foregoing and other advantages and features of the present invention will become more fully apparent by examination of the following description of the presently preferred embodiments and appended claims, taken in conjunction with the accompanying drawings.

BRIEF DESCRIPTION OF THE DRAWINGS

To better understand the invention, a more particular description of the invention will be rendered by reference to the appended drawings. These drawings only provide information concerning typical embodiments of the invention and are not to be considered limiting of its scope. The invention will be described and explained with additional specificity and detail through the use of the accompanying drawings, in which.

DETAILED DESCRIPTION OF THE PREFERRED EMBODIMENTS

Figure 1:
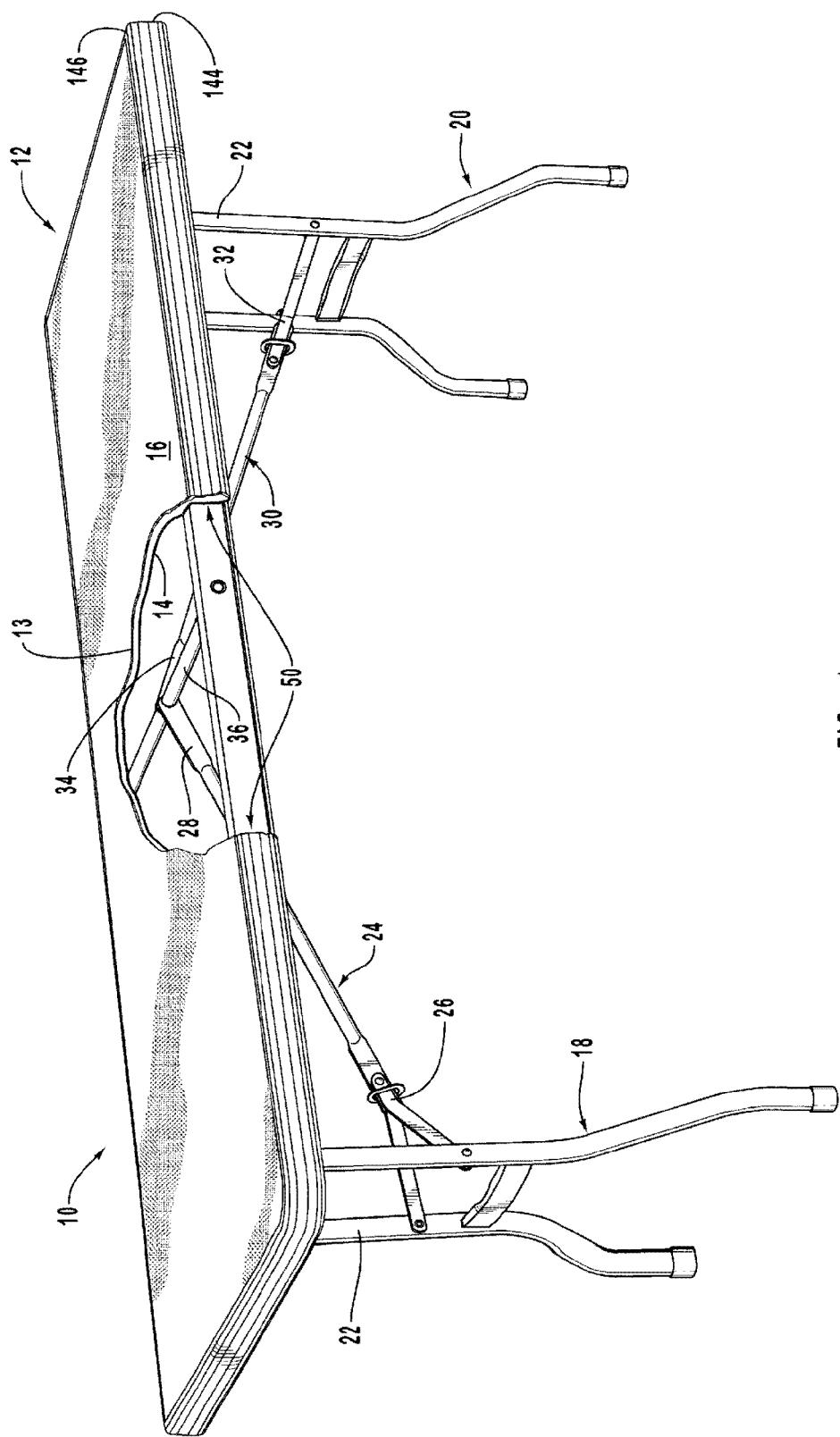
FIG. 1 is a perspective cut-away view of one presently preferred embodiment of a portable folding utility table with center support assembly.

Reference is now made to the figures wherein like parts are referred to by like numerals throughout. With particular reference to FIG. 1, a utility table according to the present invention is generally designated at 10. The utility table 10 preferably includes a table top 12 having a mounting surface 14 and a working surface 16 disposed opposite the mounting surface 14. In one presently preferred embodiment, the table top 12 is supported by a first support pedestal 18 and a second support pedestal 20. The first and second support pedestals 18, 20 may each comprise a first end 22 attached to the mounting surface 14 of the table top 12.

Figure 2:
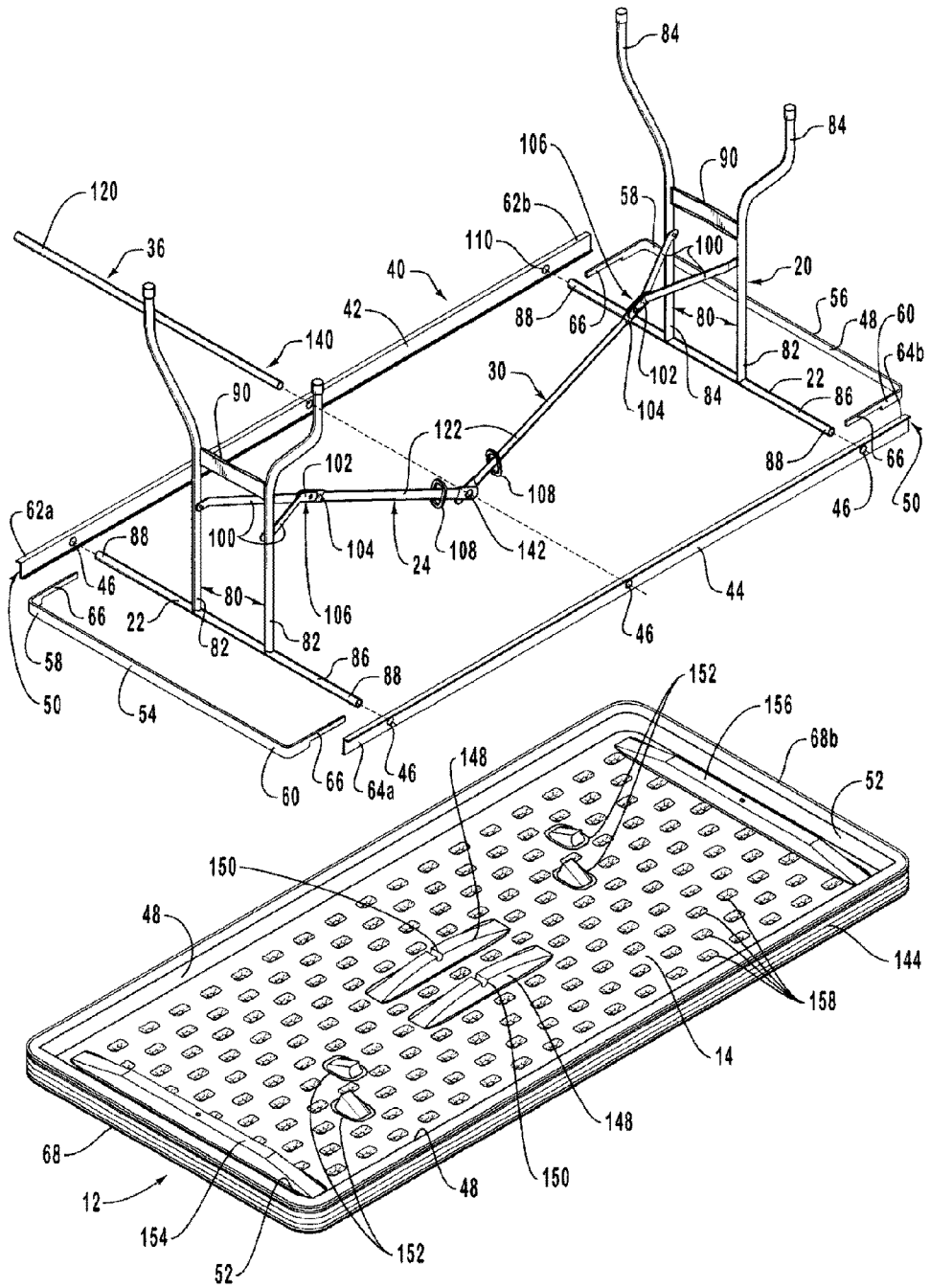
FIG. 2 is an exploded, perspective view of the embodiment of FIG. 1 illustrating various components of the present invention.

Referring now to FIGS. 1 and 2, the utility table 10 of the presently preferred embodiment includes a first pivotal support brace 24 having a proximal end 26 attached to the first support pedestal 18 and a distal end 28 attached to the mounting surface 14. Similarly, a second pivotal support brace 30 having a proximal end 32 attached to the second support pedestal 20 and a distal end 34 attached to the mounting surface 14. The distal end 28 of the first pivotal support brace 24 may be disposed contiguous the distal end 34 of the second pivotal support brace 30. The distal ends 28, 34 are disposed in relation to a retaining assembly 36, which is attached to the mounting surface 14. In one preferred embodiment, the retaining assembly 36 comprise a cross member.

As shown in FIG. 2, the utility table 10 includes a frame 40. The frame 40 may comprise a first side rail 42 and an opposing second side rail 44. Preferably, the first side rail 42 is disposed substantially parallel the opposing second side rail 44, thereby providing a generally longitudinal alignment there between. The first and second side rails 42, 44 may be configured with a plurality of retaining apertures 46 to facilitate attachment of the support pedestals 18, 20 and the cross brace member 36 to the frame 40.

In one preferred embodiment, the mounting surface 14 of the table top 12 comprises opposing longitudinal interior side walls 48, and opposing orthogonal interior side walls 52 disposed along an interior periphery of the table top 12. The first and second side rails 42, 44 may be secured to respective opposing longitudinal side walls 48, thus adding rigidity and strength to the structural integrity of table top. In one presently preferred embodiment, the side rails 42, 44 are secured into the opposing longitudinal side walls 48 by screws. It will be appreciated by those skilled in the art that the side rails 42, 44 may be secured to the opposing longitudinal side walls 48 of the mounting surface 14 in a variety of other ways readily known in the art, such as, for example, screw, bolts, rivets, and the like.

The cross-section of the sides rails 42, 44 are preferably configured having an S-shape. The side rails 42, 44 are preferably attached to the respective longitudinal side walls 48 so as to form respective channels 50 along the side rails 42, 44 between the side rails 42, 44 and the longitudinal side walls 48 (see FIGS. 1 and 2). In this configuration, the first end 22 of the support pedestals 18, 20 may be positioned within opposing respective retaining apertures 46 formed in the side rails 42, 44 abutting the longitudinal side walls 48 within the channels 50, thereby substantially preventing lateral movement of the support pedestals 18, 20 relative to the table top 12. Likewise, the cross brace member 36 may be positioned within opposing respective retaining apertures 46 formed in the side rails 42, 44 abutting the longitudinal side walls 48 within the channels 50, thereby substantially preventing lateral movement of the cross brace member 36 relative to the table top 12. The support pedestals 18, 20 and the cross brace member 36 are preferably disposed substantially parallel to each other and in spaced-apart relationship.

Still referring to FIG. 2, the frame 40 may also comprise a first end rail 54 and an opposing second end rail 56. Preferably, the first end rail 54 is disposed substantially parallel the opposing end rail 56. Each end rail 54, 56 has a first end 58 and a second end 60 and is preferably positioned along the opposing orthogonal interior side walls 52 of the mounting surface 14 of the table top 12. In one presently preferred embodiment, the first end 58 of each end rail is disposed within the channel 50 adjacent respective ends 62a, 62b of the first side rail 42. Likewise, the second end 60 of each end rail 54, 56 is disposed within a channel 50 adjacent respective ends 64a, 64b of the second side rail 44, thereby providing a generally rectangular shape to substantially correspond with the generally preferable rectangular shape of the table top 12.

In one presently preferred embodiment of the present invention, the first and second ends 58, 60 of respective end rails 54, 56 are configured with a tab member 66. The tab member 66 may be configured to fit within respective channels 50 beneath the retaining apertures 46 near the ends 62, 64 of the respective side rails 42, 44 with the utility table 10 in an upright position. It will be readily appreciated by those skilled in the art that, in this configuration, the tab members 66 act as levers with the support pedestals 18, 20 (positioned within the channels 50 near the ends 62, 64 of the respective side rails 42, 44), thus, acting as corresponding fulcrums. In this manner, the end rails 54, 56 strengthen respective ends 68a, 68b of the table top 12, and protect against bowing of the table top 12 at the ends 68a, 68b. The first and second side rails, 42, 44, in combination with the first and second end rails 54, 56 provide a means for structurally supporting the table top 12, support pedestals 18, 20, and pivotal support braces 24, 30. In this configuration, lighter weight table tops 12 may be used without losing rigidity or structural integrity.

As will be appreciated, the end rails 54, 56 may interrelate to the side rails 42, 44 in a variety of ways to provide structural support for the utility table 10 and help protect against bowing under various loads that may be applied to the utility table 10. For example, the end rails 54, 56 may be welded to the side rails 42, 44. The end rails 54, 56 may also be bonded to the side rails 42, 44 using a variety of suitable epoxies or resins. Further, the end rails 54, 56 and the side rails 42, 44 may be formed as a single unitary piece configured to the desired size and shape. It will also be appreciated that the end rails 54, 56 and the side rails 42, 44 need not interrelate at all, but could simply be attached to the respective interior opposing side walls 48, 52 of the mounting surface 14 of the table top 12.

In one presently preferred embodiment of the present invention, the frame 40 is formed of a substantially sturdy, rigid material sufficient to provide structural integrity to the table top 12. For example, the frame 40 may be formed of metal. However, it will be readily appreciated that the frame may be formed of a wide variety of other suitable materials which are consistent with the spirit and scope of the present invention. It will further be appreciated that size and configuration of the frame 40 will depend, in part, on the size and configuration of the table top 12. The table top 12 and the frame 40 may be configured in a variety of configurations, including, but not limited to, a circle, polygon, square, triangle or any other suitable geometrical configuration.

Figure 3:
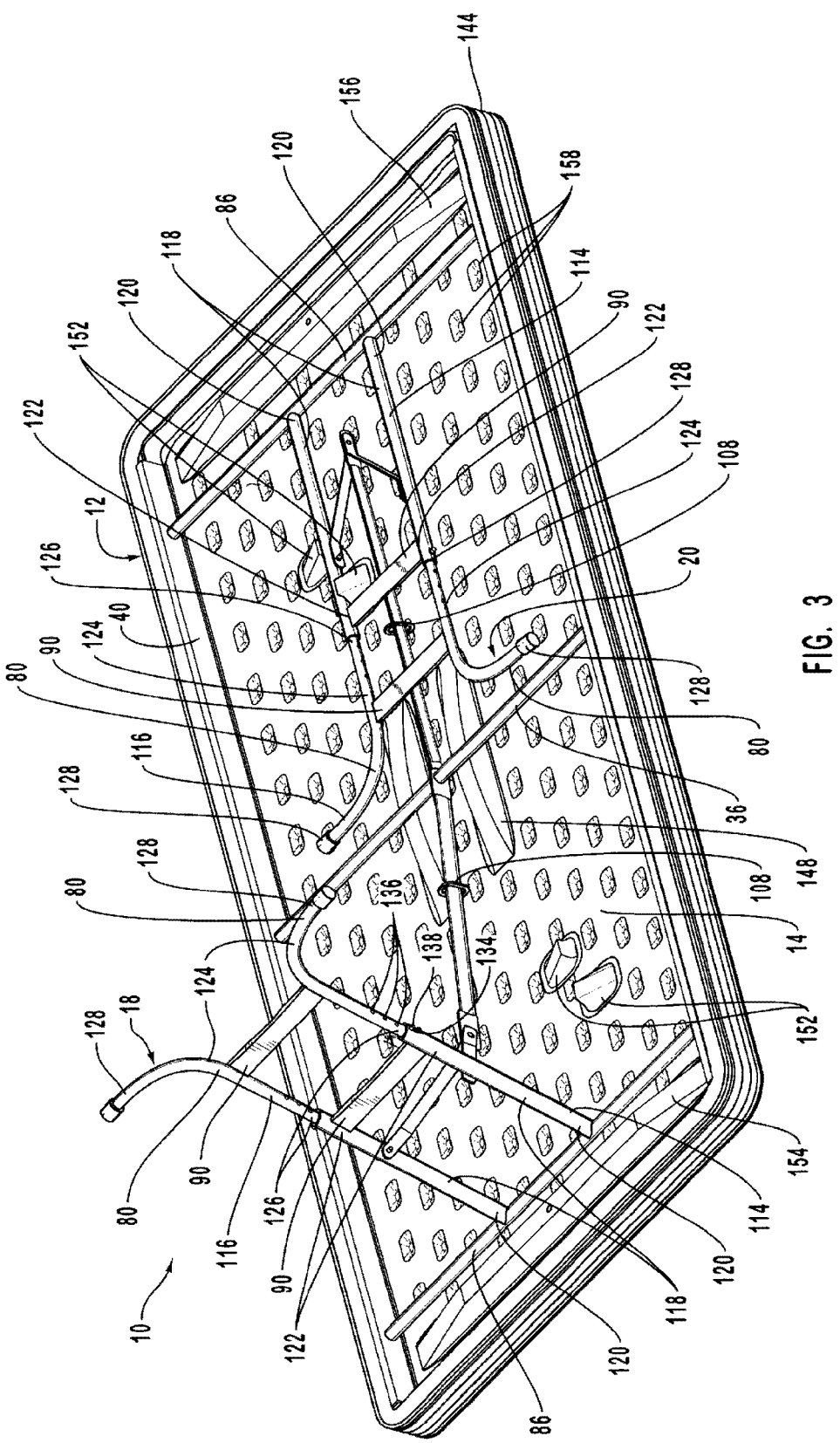
FIG. 3 is a perspective view of the embodiment of FIG. 1 illustrates a retaining assembly and support pedestals in relation to a mounting surface of the table top.

As best shown in FIG. 3, the shaped size of the frame 40 is configured to generally conform to the internal periphery of the mounting surface 14 of the table top 12. Specifically, in one presently preferred embodiment of the present invention, the frame 40 is attached in relation to the mounting surface 14 by means of fasteners (not shown) which generally penetrate both the frame 40 and an adjacent point of the mounting surface 14. As will be appreciated by those skilled in the art, a variety of other suitable means for attaching the frame 40 to the mounting surface 14 of the table top 12 may be employed, including, but not limited to, rivets, screws, bolts, glues, epoxies, or other bonding materials.

As can be seen in FIGS. 2 and 3, the mounting surface 14 of the table top 12 is preferably configured to facilitate the attachment of the frame 40 to the mounting surface of the table top 12. In one presently preferred embodiment, the mounting surface 14 is configured with seats (not shown) positioned such that the end rails 54, 56 may be positioned between respective opposing orthogonal interior walls 52 and the seats (not shown). In this configuration, the end rails 54, 56 are substantially prevented from bowing inwardly toward the center of the utility table 10 under loads exerted upon the opposing ends of the table top 12.

It will be readily appreciated that the mounting surface 14 need not have interior side walls 48, 52 at all to practice the teachings of the present invention. In this regard, the teachings of the present invention may be practiced without a frame 40 if the table top 12 is sufficiently rigid (see FIG. 4). It will further be appreciated by those skilled in the art that in the embodiments where there is no frame, the support pedestals 18, 20 and cross brace member 36 may be attached to an interior portion 70 of the mounting surface 14. Further, in preferred embodiments where there are interior side walls 48, 52, but no frame 40, the support pedestals 18, 20 and cross brace member 36 may be positioned directly in retaining (not shown) formed within the interior side walls 48, 52 of the mounting structure 14 of the table top 12.

Referring again to FIG. 2, the support pedestals 18, 20 are pivotally attached to the mounting surface 14, thereby permitting each of the support pedestals 18, 20 to be moved between a collapsed position, in which each support pedestal 18, 20 lies flat in substantially the same plane as the table top 12, and an extended position, in which each support pedestal 18, 20 is folded outward, substantially perpendicular to the plane of the table top 12.

Each support pedestal 18, 20 may include a pair of substantially parallel posts 80. Those of skill in the art will appreciate that the teachings of the present invention can be practiced if each support pedestal 18, 20 has more or less than two posts 80. Each pair of posts 80 comprises a first end 82 and a second end 84. In one presently preferred embodiment, the first end 82 of each respective pair of posts 80 is secured to a cross pole 86.

Respective ends 88 of each cross pole 86 are preferably positioned within opposing retaining apertures 46 disposed within the opposing side rails 42, 44 of the frame 40 such that the support pedestals 18, 20 may be disposed substantially parallel to each other. In this configuration, each cross pole 86 rotates within respective pairs of retaining apertures 46 when respective pedestals 18, 20 move between the collapsed position and the extended position. In one presently preferred embodiment, a stabilizer arm 90 is preferably disposed between the respective pairs of posts 80 to assist in maintaining the spaced-apart relationship of the posts 80.

It will be appreciated by those skilled in the art that the support pedestals 18, 20 may be configured in a variety of ways such that to practice the teachings of the present invention. For example, the support pedestals 18, 20 may comprise a solid or integral piece or the posts 80 may be curved in a different manner (e.g., see, FIG. 3). It will further be appreciated by those of skill in the art that the support pedestals 18, 20 need not be in pivotal engagement with the table top 12 to be collapsible. For example, the support pedestals 18, 20 may simply be detachably engaged in relation to the table top 12 such that when it is desired to collapse the utility table 10 for storage, the support pedestals 18, 20 are removed from engagement with the table top 12.

As stated above, the first and second support pedestals 18, 20 are preferably connected to the table top 12 by methods of the first and second pivotal support braces 24, 30, respectively. In one presently preferred embodiment of the present invention, the proximal ends 26, 32 of the respective pivotal support braces 24, 30 are bifurcated to facilitate pivotal engagement with the posts 80 of the respective support pedestals 18, 20 as illustrated in FIGS. 1, 2, and 3. The bifurcated proximal ends of the pivotal support braces 24, 30 each preferably comprise a pair of angled members 100.

Referring specifically to FIG. 2, the angled members 100 may include a tab member 102 which pivotally engages and partially overlaps a corresponding tab member 104 adjacent each of the distal ends 28, 34 of the pivotal support braces 24, 30, respectively, at an overlapping portion 106. When the support pedestals 18, 20 are in the extended position, the tabs 102 of the angled members 100 of the bifurcated proximal ends 26, 32 are disposed substantially parallel to the tabs 104 adjacent each distal end 28, 34 of the pivotal support braces 24, 30. When the support pedestals 18, 20 are in the collapsed position, the tabs 102 of the angled members 100 of the bifurcated proximal ends 26, 32 are disposed substantially unparallel to the tabs 104 adjacent each distal end 28, 34 of the pivotal support braces 24, 30.

The utility table 10 may include a pair of locking collars 108 which slidably engage respective pivotal support braces 24, 30. The locking collars 108 are preferably sized to fit over respective overlapping portions 106 of the pivotal support braces 24, 30 when the support pedestals 18, 20 are in the extended position. With the locking collars 108 positioned over respective overlapping portions 106, the bifurcated proximal ends 26, 32 are prevented from moving relative to corresponding distal ends 28, 34 of the pivotal support braces 24, 30, thus preventing the support pedestal supports 18, 20 from being positioned in the collapsed position without first disengaging the locking collars 108, respectively.

It will be appreciated by those skilled in the art that with the utility table 10 in an upright position and the support pedestals 18, 20 in the extended position, the collars 108 may, under the force of gravity, position themselves about the overlapping portions 106. It will further be appreciated that a variety of other locking mechanisms as assemblies may be utilized to lock the support pedestals 18, 20 in the extended position which are consistent with the spirit and scope of the present invention, including latches or other fasteners.

With reference now to FIG. 3, the utility table 10 is shown having an alternative configuration of the support pedestals 18, 20. In this alternate embodiment, each support pedestal 18, 20 comprises a first member 114 pivotally engaged to the mounting surface 14 of the table top 12 and a second member 116 configured for telescoping engagement with the first member 114, thereby permitting the height of each support pedestal 18, 20 to be selectively disposed at a predetermined height between a lengthened position and a retracted position.

In one presently preferred embodiment, each first member 114 of the support pedestals 18, 20 includes a pair of outer members 118 each having a proximal end 120 and a distal end 122. The proximal end of each outer member 118 is connected to the table top 12 by means of the cross pole 86 to which they are preferably fixed (e.g., welded). The second member 116 of each support pedestal 18, 20 includes a pair of inner members 124 each having a proximal end 126 and a distal end 128. The proximal end 126 of the inner members 124 are configured in dimensional size and shape to engage the distal ends 122 of the outer members 118 in telescopic engagement. It will be appreciated by those of skill in the art that multiple stabilizer arms 90 may be employed to support the telescopic pedestals 18, 20.

Preferably, the inner members 124 and outer members 118 are separated by a hard plastic bushing (not shown) to facilitate the slidable movement of the inner members 124 relative to the outer members 118. Each bushing may be held in place with two small extensions that extend through small holes (not shown) in the outer members 118. It will be appreciated by those of skill in the art that there are a number of ways to facilitate the telescopic movement of the first member 114 relative to the second member 116 of each support pedestal 18, 20.

In the preferred embodiment illustrated in FIG. 3, the support pedestals 18, 20 include means for locking the support pedestals 18, 20 in preselected positions between the refracted position and the lengthened position. At least one of the inner members 124 is configured with a first hole 134. A corresponding outer member 118 may be configured with at least one hole 136 and preferably a plurality of holes 136 positioned such that at a preselected table top 12 height, the first hole 134 in the inner member 124 may be aligned with a second hole 136 in the outer member 118. A snap pin mechanism 138 may be positioned adjacent the first hole 134 within the inner member 124 such that the pin 138 is biased outwardly through the aligned holes 134, 136, thereby locking the inner and outer members 118, 124 of the support pedestals 18,20 in an preselected position. By supplying sufficient force to the pin mechanism 138, it may be removed from the hole 136 in the outer member 118, thereby permitting relative movement between the inner 124 and outer 118 members of the support pedestals 18, 20 and allowing the support pedestals 18, 20 to be selectively raised or lowered. It will be appreciated by those skilled in the art that a variety of other adjustment mechanisms as assemblies known in the art for locking the first and second support pedestals 18, 20 in an extended position may be utilized and are herein incorporated.

As best shown in FIGS. 1, 2, and 3, the distal ends 28, 34 of each pivotal support brace 24, 30 are engageably secured to the retaining assembly 36 (e.g., cross brace member). In one presently preferred embodiment of the present invention, the distal ends 28, 34 of each pivotal support brace 24, 30, respectively, are pivotally attached to the retaining assembly 36. Each of said distal ends 28, 34 are configured with openings 142 having an interior periphery sufficient for engaging at least a portion of the linear length of the cross-brace member 36.

It will be appreciated by those skilled in the art that the retaining assembly generally provides structural support to the center of the table top 12 of the utility table 10. It will further be appreciated that with the distal ends 28, 34 attached contiguous each other in retention to the cross brace member 36, forces applied to the table top 12 which would ordinarily be transferred through one of the support pivotal braces 24, 30, respectively into the table top 12 causing it to bow, will substantially be nullified by the counter force provided by the other pivotal support brace 24, 30, respectively.

For example, the horizontal component of a force applied by a user at one end 68a of the table top 12 will act upon the pivotal support brace 18 and, because the distal ends 28, 34 of the pivotal support braces 24, 30, respectively, are attached to the retaining assembly 36, an equal and opposite horizontal force component applied by the other pivotal support brace 20 will substantially cancel out the horizontal component of the original force. Accordingly, the present invention provides increased support with fewer parts. As will be appreciated by those skilled in the art, the retaining assembly 36 can be disposed in a variety of configurations which are consistent with the spirit and scope of the present invention so as to allow the pivotal support braces 24, 30 to supportably interrelate with each other. One such alternative configuration is discussed below.

With reference to FIGS. 1, 2 and 3, the table top 12 is preferably formed of a blow-molded plastic, and specifically, high density polyethylene. It will be appreciated by those of skill in the art, however, that the table top 12 may be formed of a variety of other sufficiently sturdy materials such as, plywood, particle board, solid wood, wood slates, metal alloys, fiberglass, ceramics, graphite, any of numerous organic, synthetic or processed materials, including thermoplastic or thermosetting polymers of high molecular weight with or without additives, such as, plasticisers, auto oxidants, extenders, colorants, ultraviolet light stabilizers, or fillers and/or other composite materials.

Referring back to FIG. 1, in one presently preferred embodiment of the present invention, the working surface 16 of the table top 12 may be textured. In addition, the working surface 16 may comprise an outer periphery 144 having at least a portion 146 which is beveled to increase the comfort of a person resting their arms against the edges of the table top 12. In one presently preferred embodiment, the entire outer periphery 144 of the working surface 16 of the table top 12 is beveled. The height of the blow-molded table top 12 of the preferred embodiment is about five centimeters, the thickness of any panel 13 of the blow-molded table top 12 is preferably about one-half of a centimeter and about three-quarters of a centimeter.

Referring now to FIGS. 2 and 3, the mounting surface 14 may include at least one mount 148. Preferably, a pair of mounts 148 are attached to the mounting surface 14 to receive and retain the cross brace member 36 of the retaining assembly. Each mount 148 includes a groove 150 configured as a corresponding size and shape sufficient to the cross brace member 36 therein. In one presently preferred embodiment, the cross brace member 36 may be snap fit into the groove 150 of the mount 148.

Additionally, the mounting surface 14 of the table top 12 may further include a securing member 152 for securing each of the support pedestals 18, 20, respectively. Preferably, a pair of securing members 152 are disposed in relation to the mounting surface 14 for releasably securing a respective support pedestal 18, 20 in the collapsed position adjacent the mounting surface 14. Each securing member 152 is generally configured and disposed relative to the mounting surface 14 such that when the support pedestals 18, 20 are in the collapsed position, the least one securing member 152 frictionally engages a support pedestal post 80 such that the support pedestals 18, 20, respectively, are maintained in the collapsed position, as illustrated in FIG. 3. In one presently preferred embodiment, a pair of securing member 152 are offset on opposing sides of a single support pedestal post 80 for securing each of the support pedestals 18, 20, respectively, in the collapsed position.

As best shown in FIGS. 2 and 3, a first manifold 154 and a second manifold 156 are preferably disposed at opposing ends 68a, 68b of the table top 12. The manifolds 154, 156 provide additional support for the ends 68a, 68b of the table top 12 and assist in facilitating the blow molding process by providing a means for uniformly dispersing air down the length of the table top 12. The mounting surface 14 of the table top 12 may also include a plurality of depressions 158 (e.g., kiss-offs) which add structural support to the table top 12. In one presently preferred embodiment, these depressions 158 are uniformly distributed throughout the mounting surface 14 of the table top 12.

The structural features of the table top 12, including the beveled and/or textured working surface 16, the mounts 148, the securing members 152, the manifolds 154, 156, and the depressions 158 may be integral with the table top 12 and one preferably created by means of a corresponding mold and blow-molding process. It will be appreciated by those skilled in the art that there are alternative ways to create and attach these features. For example, the mounts 148 securing members 152 and manifolds 154, 156 may be separate pieces attached to the mounting surface by adhesive bonding or the use of fasteners. Likewise, the texturing and/or beveling of the working surface and the introduction of depressions into the mounting surface may also be accomplished after the table top 12 is molded by a variety of conventional methods readily known in the art.

Figure 4:
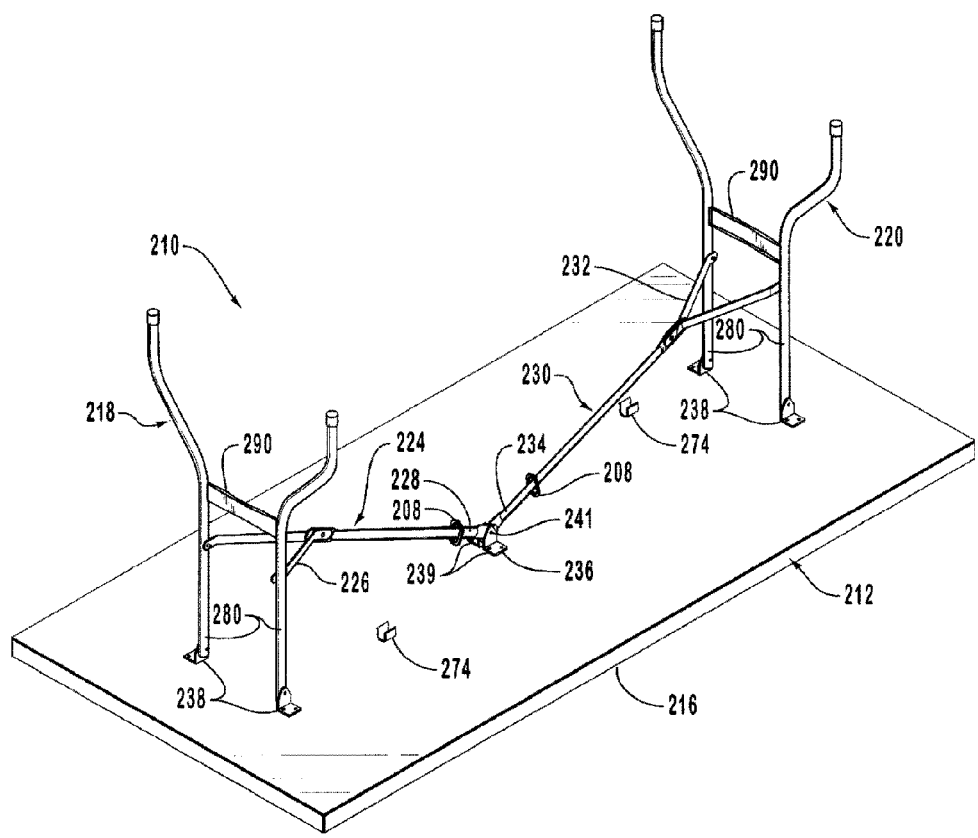
FIG. 4 is a perspective view of yet another presently preferred embodiment of the portable folding utility table with center support assembly.

With reference now to FIG. 4, another presently preferred embodiment of the utility table of the present invention is generally designated at 210. In this embodiment, the utility table 210 includes a table top 212 having a mounting surface 214 and a working surface 216 disposed opposite the mounting surface 214. A first support pedestal 218 and a second support pedestal 220 are pivotally attached to the mounting surface 214 of the table top 212 by means of a respective pairs of brackets 222. Each support pedestal 218, 220 may include a pair of substantially parallel posts 280 each having a first end 282 secured to one of the mounting brackets 238. In this configuration, the support pedestals 218, 220 may be moved between a collapsed position, in which each support pedestal 218, 220 lies flat in substantially the same plane as the table top 212 and an extended position, in which each support pedestal 218, 220 is folded outward substantially perpendicular to the plane of the table top 212.

Preferably, the utility table 210 includes a first pivotal support brace 224 having a bifurcated proximal end 226 attached to the first support pedestal 218 and a distal end 228 attached to the mounting surface 214. Similarly, a second pivotal support brace 230 having a bifurcated proximal end 232 attached to the second support pedestal 220 and a distal end 234 attached to the mounting surface 214. Each of said distal ends 228, 234 of the pivotal support braces 224, 230 are configured with openings 242 (not shown).

As with the utility table 10 of the embodiments illustrated in FIGS. 1-3, the embodiment of FIG. 4 may include a pair of locking collars 108 which slidably engage respective pivotal support braces 224, 230. The locking collars 108 are preferably sized to such that when the support pedestals 218, 220 are in the extended position, the locking collars 108 can be positioned to prevent the bifurcated proximal ends 226, 232 are prevented from moving relative to corresponding distal ends 228, 234 of the pivotal support braces 224, 230, thus preventing the support pedestal supports 218, 220 from being positioned in the collapsed position without first disengaging the locking collars 108, respectively.

In one presently preferred alternate embodiment, a retaining assembly 236 comprises a pair of L-shaped brackets 239, each of which includes an opening (not shown). The distal ends 228, 234 of each pivotal support brace 224, 230, respectively, are pivotally attached to the retaining assembly 236 by means of a pivot pin 241. It will be appreciated by those skilled in the art that there are a number of ways to secure the distal ends 228, 234 of the pivotal support braces 224, 230, respectively contiguous to each other in supportable relation to the mounting surface 214 of the table top 212. These may include a variety of brackets, or plates to which the distal ends 228, 234 of the pivotal support braces 224, 230, respectively, are attached by fasteners, including, but not limited to, a cotter pin, bolt, rivet, clamp or the like.

The table top 212 of the embodiment illustrated in FIG. 4 may be formed of a variety of sufficiently sturdy materials such as, plywood, particle board, solid wood, wood slates, metal alloys, fiberglass, ceramics, graphite, any of numerous organic, synthetic or processed materials, including high density polyethylene thermoplastic or thermosetting polymers of high molecular weight with or without additives, such as, plasticisers, auto oxidants, extenders, colorants, ultraviolet light stabilizers, or fillers and/or other composite materials. It will also be appreciated by those with skill in the art that telescoping pedestals discussed previously may also be used with this embodiment.

As illustrated in FIG. 1, with the utility table 10 is in an upright position and the support pedestals 18, 20 extended with the collars 108 placed over the overlapping portions 106 of respective pivotal support braces 24, 30, the utility table of the present invention is disposed for use. When a user desires to collapse the table for storage, one preferred method is to invert the utility table 10 as illustrated in FIG. 3. With the utility table 10 in the inverted position, the collars 108 may be slid away from the overlapping portion 106 of respective pivotal support braces 24, 30. This allows the support pedestals 18, 20 to be folded inwardly toward the table top 12 into the collapsed position. With the support pedestals 18, 20 in the collapsed position, the utility table 10 can easily be moved and stored.

Many of the problems associated with prior art portable folding utility tables are addressed by the teachings of the present invention. From the above discussion, it will be appreciated that the present invention provides a novel portable folding utility table having a center support assembly that is durable enough to withstand increased wear and tear, yet is light-weight enough to easily set up and take down. The present invention also provides a utility table with a center support retaining assembly that provides increased stability and structural integrity with an efficient design that allows the interrelation of the support pedestals to each other. The center support retaining assembly of the utility table of the present invention is also cost effective to manufacture and does not compromise the structural integrity of the table top. The present invention also provides a portable folding utility table that includes a workers surface that is comfortable to work at.

It should be appreciated that the apparatus of the present invention is capable of being incorporated in the form of a variety of embodiments, only a few of which have been illustrated and described above. The invention may be embodied in other forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A table comprising:
    a table top constructed from molded plastic as part of a unitary, one-piece structure, the table top comprising:
        a working surface;
        a mounting surface;
        a hollow interior portion disposed between the working surface and the mounting surface;
        a plurality of depressions disposed in the mounting surface, the working surface, the mounting surface, the hollow interior portion and the plurality of depressions being integrally formed as part of a unitary, one-piece structure, the plurality of depressions comprising:
            a first row of at least ten generally aligned depressions; and
            a second row of at least ten generally aligned depressions;
    a first leg assembly selectively movable between an extended position and a collapsed position relative to the table top; and
    a second leg assembly selectively movable between an extended position and a collapsed position relative to the table top.

2. The table as in claim 1, wherein the first row of depressions is disposed adjacent to the second row of depressions; and
    wherein the first row of depressions and the second row of depressions are offset.

3. The table as in claim 1, wherein the first row of depressions is disposed proximate a first portion of an outer periphery of the table top; and
    wherein the second row of depressions is disposed proximate a second portion of the outer periphery of the table top.

4. The table as in claim 1, wherein the first row of depressions comprises at least twenty depressions; and
    wherein the second row of depressions comprises at least twenty depressions.

5. The table as in claim 1, wherein the first row of depressions comprises at least thirty depressions; and
    wherein the second row of depressions comprises at least thirty depressions.

6. The table as in claim 1, wherein the first leg assembly is at least substantially disposed between the first row of depressions and the second row of depressions when the first leg assembly is disposed in the collapsed position; and
    wherein the second leg assembly is at least substantially disposed between the first row of depressions and the second row of depressions when the second leg assembly is disposed in the collapsed position.

7. The table as in claim 1, further comprising a first column of at least ten generally aligned depressions disposed in the mounting surface of the table top; and
    further comprising a second column of at least ten generally aligned depressions disposed in the mounting surface of the table top.

8. The table as in claim 1, further comprising a first longitudinal interior side wall of the table top and a second longitudinal interior side wall of the table top;
    wherein the first row of depressions is disposed proximate the first longitudinal interior side wall and the second row is depressions is disposed proximate the second longitudinal interior side wall.

9. The table as in claim 8, further comprising a frame attached to the table top, the frame comprising:
   a first side rail at least partially disposed between the first row of depressions and the first longitudinal interior side wall; and
   a second side rail at least partially disposed between the second row of depressions and the second longitudinal interior side wall.

10. The table as in claim 9, further comprising a first channel disposed between the first side rail of the frame and the first longitudinal interior side wall; and
   further comprising a second channel disposed between the second side rail of the frame and the second longitudinal interior side wall.

11. A table top constructed from molded plastic as part of a unitary, one-piece structure, the table top comprising:
   a working surface;
   a mounting surface;
   a hollow interior portion disposed between the working surface and the mounting surface; and
   a plurality of depressions disposed in the mounting surface, the plurality of depressions being generally uniformly distributed throughout the mounting surface, the working surface, the mounting surface, the hollow interior portion and the plurality of depressions being integrally formed as part of a unitary, one-piece structure, the plurality of depressions comprising:
      a first row of at least ten generally aligned depressions; and
      a second row of at least ten generally aligned depressions.

12. The table top as in claim 11, wherein the first row of depressions is disposed adjacent to the second row of depressions; and
   wherein the first row of depressions and the second row of depressions are offset.

13. The table top as in claim 11, wherein the first row of depressions is disposed proximate a first portion of an outer periphery of the table top; and
   wherein the second row of depressions are disposed proximate a second portion of the outer periphery of the table top.

14. The table top as in claim 11, wherein the first row of depressions comprises at least twenty depressions; and
   wherein the second row of depressions comprises at least twenty depressions.

15. The table top as in claim 11, wherein the first row of depressions comprises at least thirty depressions; and
   wherein the second row of depressions comprises at least thirty depressions.

16. The table top as in claim 11, further comprising a first column of at least five generally aligned depressions; and
   further comprising a second column of at least five generally aligned depressions.

17. The table top as in claim 11, further comprising a first column of at least ten generally aligned depressions; and
   further comprising a second column of at least ten generally aligned depressions.

18. The table top as in claim 11, further comprising a first longitudinal interior side wall and a second longitudinal interior side wall;
   wherein the first row of depressions is disposed proximate the first longitudinal interior side wall and the second row is depressions is disposed proximate the second longitudinal interior side wall.

19. The table top as in claim 18, further comprising a frame attached to the table top, the frame comprising:
   a first side rail at least partially disposed between the first row of depressions and the first longitudinal interior side wall; and
   a second side rail at least partially disposed between the second row of depressions and the second longitudinal interior side wall.

20. The table top as in claim 19, further comprising a first channel disposed between the first side rail and the first longitudinal interior side wall; and
   further comprising a second channel disposed between the second side rail and the second longitudinal interior side wall.

21. The table top as in claim 11, wherein the table top is formed from blow-molded plastic; and
   wherein the working surface, the mounting surface, the hollow interior portion and the plurality of depressions are integrally formed as part of the unitary, one-piece structure during the blow-molding process.

22. The table as in claim 1, wherein the table is a portable folding table, the first leg assembly is movable between the extended and collapsed positions relative to a first portion of the table top, and the second leg assembly is movable between the extended and collapsed positions relative to a second portion of the table top.

23. The table as in claim 1, wherein the first leg assembly has a telescoping configuration to allow the height of the first leg assembly to be selectively adjusted; and
   wherein the second leg assembly has a telescoping configuration to allow the height of the second leg assembly to be selectively adjusted.

24. The table as in claim 1, wherein the table top is formed from blow-molded plastic; and
   wherein the working surface, the mounting surface, the hollow interior portion and the plurality of depressions are integrally formed as part of the unitary, one-piece structure during the blow-molding process.

* * * * *

UNITED STATES PATENT AND TRADEMARK OFFICE
CERTIFICATE OF CORRECTION

PATENT NO. : 8,438,982 B2
APPLICATION NO. : 13/316760
DATED : May 14, 2013
INVENTOR(S) : Stanford It is certified that error appears in the above-identified patent and that said Letters Patent is hereby corrected as shown below:

On the Title Page, in Item (57), under "ABSTRACT", in Column 2, Line 14, delete "collaspsed" and insert -- collapsed --, therefor.

On Title Page 4, in Item (56), under "OTHER PUBLICATIONS", in Column 1, Line 35, delete "Respones" and insert -- Responses --, therefor.

On Title Page 4, in Item (56), under "OTHER PUBLICATIONS", in Column 1, Line 41, delete "GTL" and insert -- GLT --, therefor.

In the Specification:

In Column 8, Line 32, delete "refracted" and insert -- retracted --, therefor.

In the Claims:

In Column 13, Line 1, in Claim 8, delete "is depressions" and insert -- of depressions --, therefor.

In Column 14, Line 12, in Claim 18, delete "is depressions" and insert -- of depressions --, therefor.

Signed and Sealed this
Thirtieth Day of July, 2013

Teresa Stanek Rea
*Acting Director of the United States Patent and Trademark Office*